United States Patent
Sloan

(10) Patent No.: US 12,497,680 B2
(45) Date of Patent: Dec. 16, 2025

(54) EDGE BUILD-UP MEASUREMENT

(71) Applicant: ArcelorMittal, Luxembourg (LU)

(72) Inventor: David Sloan, Hamilton (CA)

(73) Assignee: ArcelorMittal, Luxembourg (LU)

( * ) Notice: Subject to any disclaimer, the term of this patent is extended or adjusted under 35 U.S.C. 154(b) by 740 days.

(21) Appl. No.: 17/638,347

(22) PCT Filed: Aug. 29, 2019

(86) PCT No.: PCT/IB2019/057275
§ 371 (c)(1),
(2) Date: Feb. 25, 2022

(87) PCT Pub. No.: WO2021/038278
PCT Pub. Date: Mar. 4, 2021

(65) Prior Publication Data
US 2022/0290284 A1    Sep. 15, 2022

(51) Int. Cl.
*C23C 2/20* (2006.01)
*C23C 2/06* (2006.01)
(Continued)

(52) U.S. Cl.
CPC .................. *C23C 2/20* (2013.01); *C23C 2/40* (2013.01); *G05B 19/404* (2013.01); *C23C 2/06* (2013.01);
(Continued)

(58) Field of Classification Search
CPC ................. C23C 2/20; C23C 2/40; C23C 2/06
See application file for complete search history.

(56) References Cited

U.S. PATENT DOCUMENTS 4,189,288 A * 2/1980 Halter .................. B29C 48/907
                                                  425/141
6,407,546 B1    6/2002 Le et al.
(Continued)

FOREIGN PATENT DOCUMENTS

CN           1550570 A    12/2004
CN         101352931 A     1/2009
(Continued)

OTHER PUBLICATIONS

Search Report of PCT/IB2019/057275 dated Feb. 6, 2020.

*Primary Examiner* — Kelly M Gambetta
(74) *Attorney, Agent, or Firm* — Davidson Kappel LLC

(57) ABSTRACT

A method for controlling, on a metallic coated coil being wound, the coating thickness homogeneity, the method including the following steps of A) measuring a first distance between a first reference point and a first point on the coil surface; B) measuring a second distance between a second reference point and a second point on the coil surface the first and second points on the coil being situated at different spots along the coil width; C) computing a difference between the first distance and the second distance, the difference is noted Δ12true; D) saving the difference Δ12true defining a threshold value, comparing each saved difference Δ12true to said threshold value and/or comparing a sum of differences Δ12true to the threshold value, emitting an alert when the difference Δ12true and/or the sum of differences Δ12true is higher than the threshold value.

11 Claims, 8 Drawing Sheets

(51) Int. Cl.
*C23C 2/40* (2006.01)
*G05B 19/404* (2006.01)

(52) U.S. Cl.
CPC ............ *G05B 2219/37368* (2013.01); *G05B 2219/37398* (2013.01); *G05B 2219/50063* (2013.01)

(56) References Cited

U.S. PATENT DOCUMENTS

| | | |
|---|---|---|
| 2005/0183671 A1 | 8/2005 | Ochiai et al. |
| 2006/0246213 A1* | 11/2006 | Moreau ................ C23C 4/12 118/712 |
| 2008/0233414 A1 | 9/2008 | Sinsel et al. |
| 2013/0133575 A1 | 5/2013 | Gauje et al. |
| 2013/0319326 A1 | 12/2013 | Guastini et al. |
| 2019/0168259 A1* | 6/2019 | Zhou ................ B65D 85/72 |

FOREIGN PATENT DOCUMENTS

| | | |
|---|---|---|
| CN | 103080695 A | 5/2013 |
| CN | 103492603 A | 1/2014 |
| CN | 107422552 A | 12/2017 |
| CN | 107607064 A | 1/2018 |
| CN | 109863090 A | 6/2019 |
| EP | 1338344 A2 | 8/2003 |
| JP | S61245902 A | 11/1986 |
| JP | H03186716 A | 6/2002 |
| JP | 2007063647 A | 3/2007 |
| JP | 2009275242 A | 11/2009 |
| KR | 20040020468 A | 3/2004 |
| KR | 20150074949 A | 7/2015 |
| KR | 101683711 B1 | 12/2016 |
| WO | WO03018859 A2 | 3/2003 |

* cited by examiner

EDGE BUILD-UP MEASUREMENT

The present invention relates to a method and an equipment to control, on a metallic coated coil being wound, the coating thickness homogeneity along its width direction.

BACKGROUND

Nowadays, steel strips are generally coated, by various coatings, to enhance their surfaces properties. Those coatings are usually done by passing the steel strip through a coating bath which adheres/sticks to the strip surface. Upon exiting said coating bath, the coating thickness is tuned using wiping means. After, the strip is usually thermally treated and then coiled at a coiling station.

SUMMARY OF THE INVENTION

Said wiping means 1 generally comprise air knifes 2 situated on both faces of the strip S and baffles 3 on its sides, as represented in FIG. 1. Moreover, the baffles position influences greatly the coating quality on the strip edges, i.e. the coating thickness and homogeneity on the edges. When said baffles position is not correctly set, a coating build-up tends to form on the strip, especially on the edges. Upon coiling, the coating build-up on the strip edges superimposes and ultimately leads to a coil 4 having a bigger circumference around its edges 5 than around its center 6, such a coil is represented on FIG. 2. This is detrimental for the quality product because the strip edges will be stretched and will lead during uncoiling to wavy edges. Industrially, only a determined amount of build-up is acceptable, e.g. only a determined variation circumference along the coil width is acceptable. Above this amount, the wavy edges might have to be removed and the coil has to be downgraded which is economically bad.

Depending on various parameters such as the strip width, the desired coating thickness, the coating composition, the wiping means wear, the properties of the used gas and the strip speed; the wiping parameters such as the baffle and the wiping means positions have to be adjusted to suppress the edge build-up. Consequently, the baffle position cannot be set once and for all but has to be regularly adjusted.

At the coiling station, the coating thickness homogeneity, along the width direction, is generally manually controlled by an operator which presents several drawbacks. Firstly, there are safety concerns because the operator must be near a moving strip during its coiling process. Secondly, the measurement is not precise and is dependent of the operator. Thirdly, there is a lag between the build-up measurement and the time where the baffle can be adjusted because the measurement is time consuming and the data transfer is not immediate.

An object of the present invention is to provide a solution permitting to optimize the build-up measurement of a coil being wound and solve the aforementioned problems.

The present invention provides a method for controlling, on a metallic coated coil being wound, the coating thickness homogeneity, said method comprising the following steps:
A) measuring a first distance, D1, between a first reference point, R1, and a first point on the coil surface C1,
B) measuring a second distance, D2, between a second reference point, R2, and a second point on the coil surface C2,
said first and second points on the coil being situated at different spots along the coil width
C) computing a difference between said first distance D1 and said second distance D2, said difference is noted Δ12true
D) saving said difference Δ12true
E) repeating said steps A, B, C and D while moving at least one of the first or the second point on the coil surface along at least a tenth of the whole coil width, defining a threshold value M,
comparing each saved difference Δ12true to said threshold value M or comparing a sum of differences Δ12true to said threshold value M,
emitting an alert when said difference Δ12true or said sum of differences Δ12true is higher than said threshold value M.

The present invention also provides a coiling station controlling, on a metallic coated coil being wound, the coating thickness homogeneity, said coiling station comprising
a first distance measurement system M1 able to measure a first distance, D1, between a first reference point, R1, and a first point on the coil surface C1
a second distance measurement system M2 able to measure a second distance, D2, between a second reference point, R2, and a second point on the coil surface C2
a displacement system permitting to move said first distance measurement system, M1, and/or said second distance measurement system, M2, at least along the whole coil width,
said first and second distance measurement systems, M1 and M2, being able to be positioned at a distance between 0.15 m and 2.00 m, from the coil position,
a computing means connected to said first and second distance measurement systems, M1 and M2,
an alerting means connected to said computing means.

BRIEF DESCRIPTION OF THE DRAWINGS

Other characteristics and advantages will become apparent from the following detailed description of the invention.

To illustrate the invention, various embodiments will be described, particularly with reference to the following figures.

DETAILED DESCRIPTION

The invention relates to a method for controlling, on a metallic coated coil being wound, the coating thickness homogeneity, said method comprising the following steps:
A) measuring a first distance, D1, between a first reference point, R1, and a first point on the coil surface C1,
B) measuring a second distance, D2, between a second reference point, R2, and a second point on the coil surface C2,
    said first and second points on the coil being situated at different points along the coil width
C) computing a difference between said first distance D1 and said second distance D2, said difference is noted Δ12true
D) saving said difference Δ12true
E) repeating said steps A, B, C and D while moving at least one of the first or the second point on the coil surface along at least a tenth of the whole coil width,
F) defining a threshold value M,
G) comparing each saved difference Δ12true to said threshold value M or comparing a sum of differences Δ12true to said threshold value M,
H) emitting an alert when said difference Δ12 or said sum of differences Δ12true is higher than said threshold value M.

Figure 1:
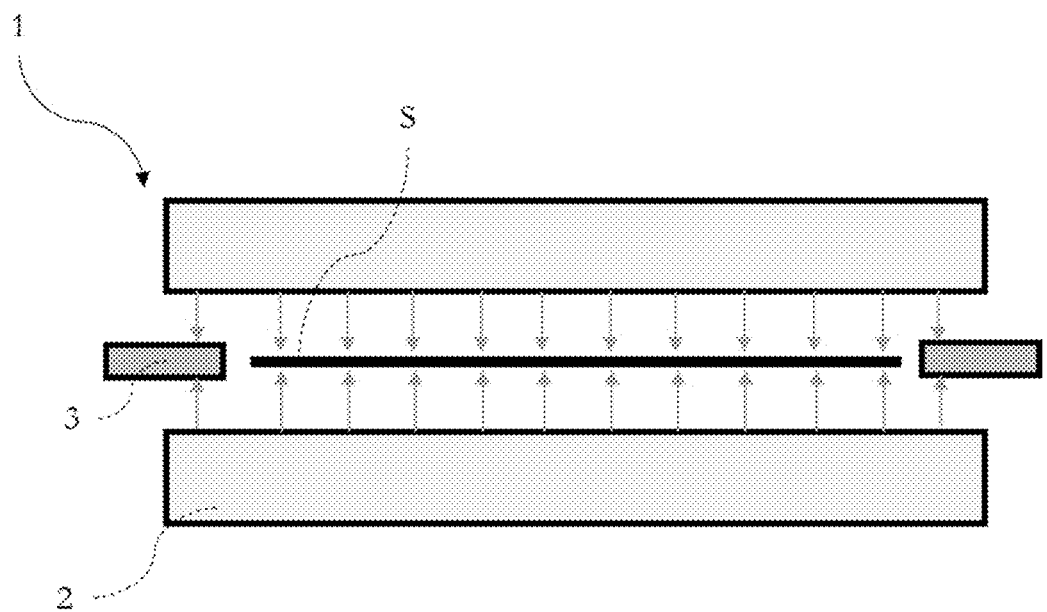
FIG. 1 exhibits a strip being wiped by wiping means comprising air knifes and baffles.
Figure 2:
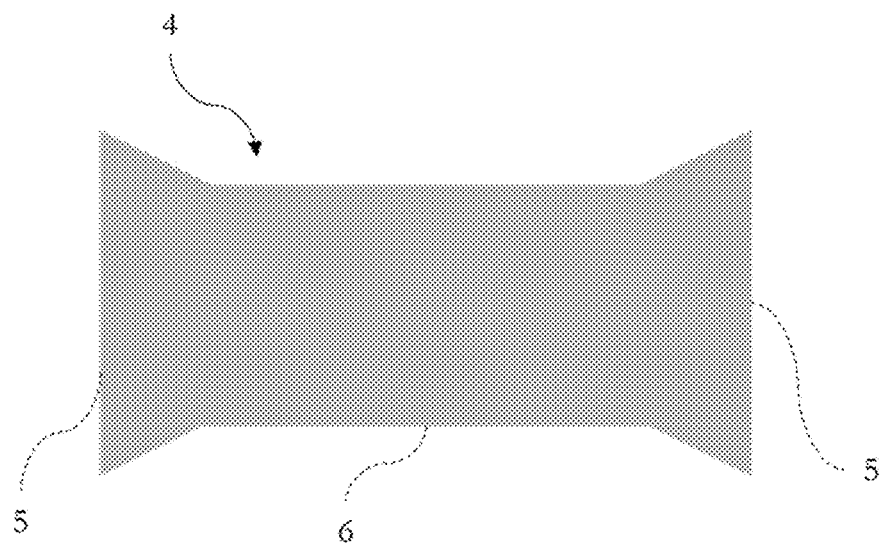
FIG. 2 exhibits a coil having edge build-up on its edges.
Figure 3:
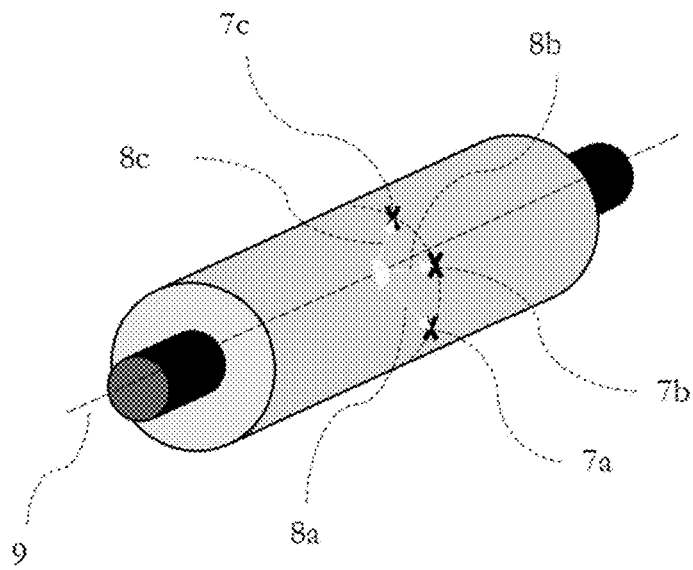
FIG. 3 exhibits a coil, three points on the coil surface and their distance to the coil revolution axis.

The control of the coating thickness along the coil width is based on the comparison of the coil thickness at different point along the coil width. The coil thickness is assumed to be the same for any point around the coil for a determined point along the coil width. This is represented in FIG. 3, where three points (7a, 7b, 7c) on the coil surface and their distance (8a, 8b, 8c) to revolution axis 9 of the coil are represented and assumed equal during winding. The coil thickness depends on several parameters such as the layer number of the coil, the strip thickness and the coating thickness. The influence on the coil thickness along the coil width of the two first parameters is considered as being neglectable. Consequently, the coil thickness variation along the coil width mainly depends on the coating thickness variation along the coil width. So, as previously explained, when the wiping means are not correctly set, more coating might be present on the edges than on the center of the steel strip and upon winding, an edge build-up is formed leading to a coil similar to one represented in FIG. 2. It is also possible that more coating is present at another portion along the strip width, e.g. if the air knives are flawed.

The metallic coated coil can be made of steel having a zinc-based coating and can be wound at a coiling station.

Figure 4:
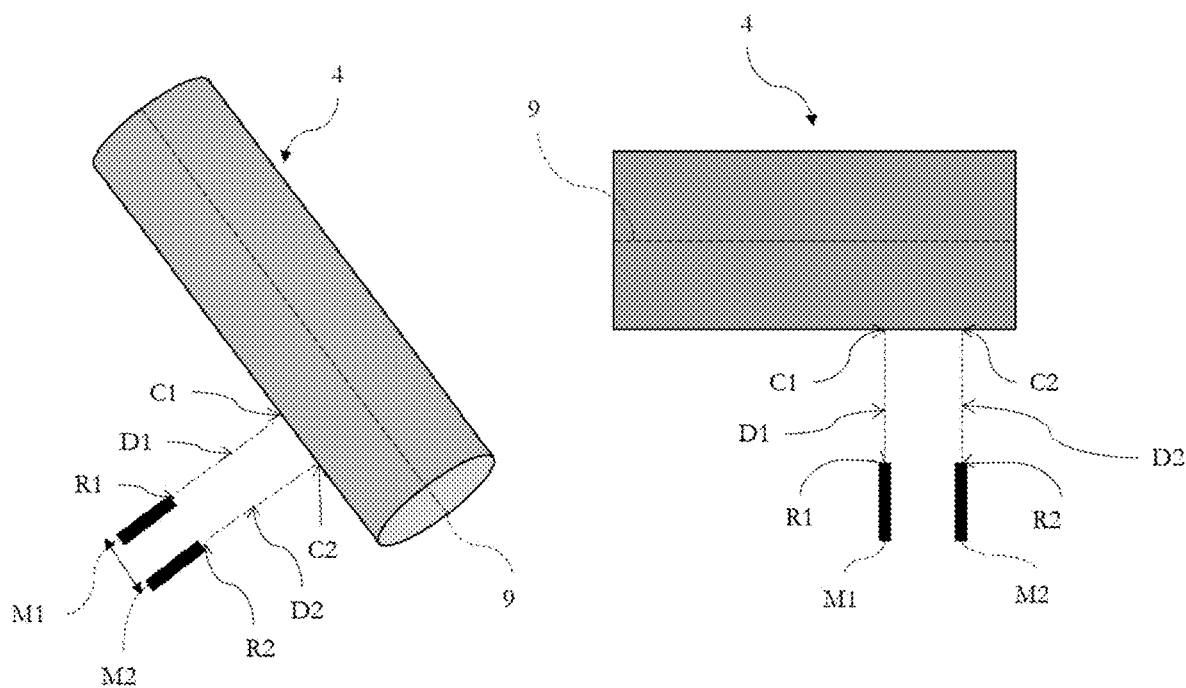
FIG. 4 exhibits an embodiment of the invention comprising two measuring distance means and a coil.
Figure 5A:
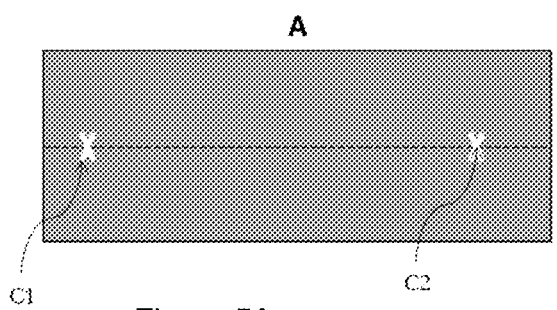
FIGS. 5A, 5B, 5C and 5D exhibit four different cases of a first point on the coil surface relative a second point on the coil surface.
Figure 5B:
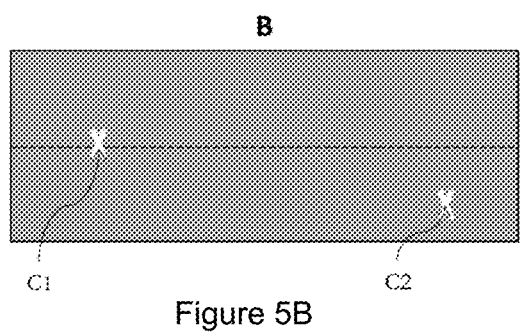
Figure 5C:
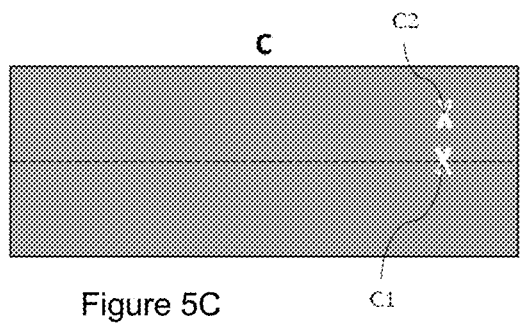
Figure 5D:
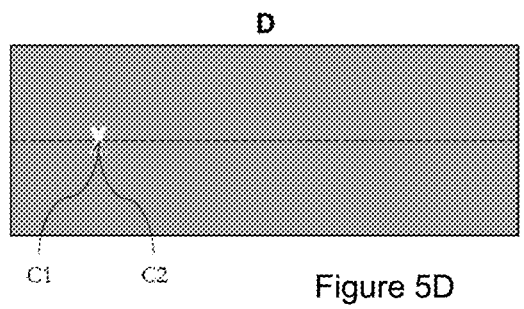

As illustrated in FIG. 4, in the first step A mentioned above, the distance, D1, between a first reference point, R1, and a first point on the coil surface, C1, is measured. The point reference R1 can be approximated as an extremity of a first measuring means, M1, measuring said distance D1. So the distance D1 is the distance between a first measuring means M1 and a point on the coil surface C1.

As illustrated in FIG. 4, in the second step B, the distance, D2, between a second reference point, R2, and a second point on the coil surface, C2, also is measured. The second reference point, R2, can be approximated as an extremity of a second measuring means, M2, measuring said distance D2. So the distance D2 is the distance between a second measuring means M2 and a second point on the coil surface C2.

Both first and second distance, D1 and D2, are preferentially the shortest distance between their reference point and said coil. Such an arrangement eases the determination of D1 and D2 and thus Δ12true.

The first and second points on the coil, C1 and C2, are situated at different points along the coil width. A coil, its revolution axis and the first and second distances are represented in FIGS. 5A to D for four different cases, wherein a coil surface can be defined by a width and a height, said height corresponding to a circumference:
A) C1 and C2 are on the same points along the coil height but at different points along the coil width
B) C1 and C2 are on different points along the coil height and at different points along the coil width
C) C1 and C2 are on different points along the coil height but at the same point along the coil width
D) C1 and C2 are on the same points along the coil height and at the same point along the coil width, so they are on the same spot.

Consequently, on the FIG. 5, only the cases A and B correspond to the claimed method because C1 and C2 are situated at different points along the coil width.

Preferably, said steps A and B are done within 1 second. It permits that the assumption of the layer number on the measurement is closer to the reality. Even more preferably, said steps A and B are done within 0.5 second Then, a difference, noted Δ12true, between said first distance D1 and said second distance D2 is computed. The difference noted Δ12true represents the impact of the coating build-up on the coil diameter for the first and second reference point. But, because the reference points, R1 and R2, might be at a different distance from the coil revolution axis, or on in practice the mandrel, this difference Δ12true might need an adjustment. Δ12 is the distance difference between D1 and D2.

Figure 6A:
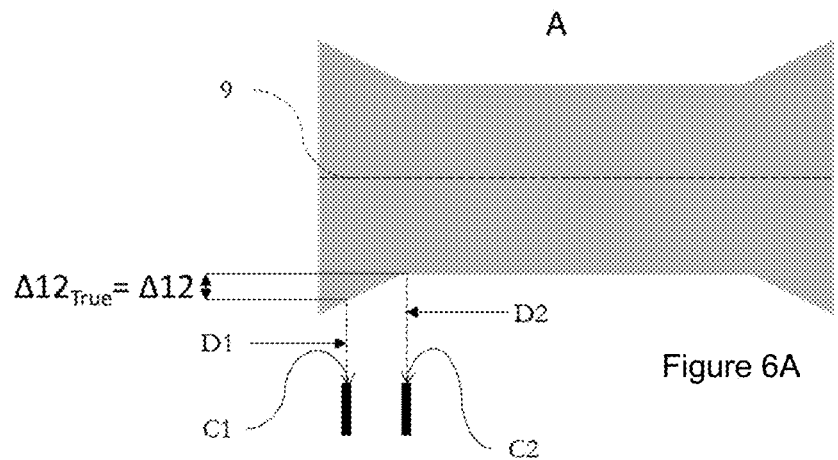
FIGS. 6A, 6B and 6C exhibit three different cases explaining what is Δ12true.
Figure 6B:
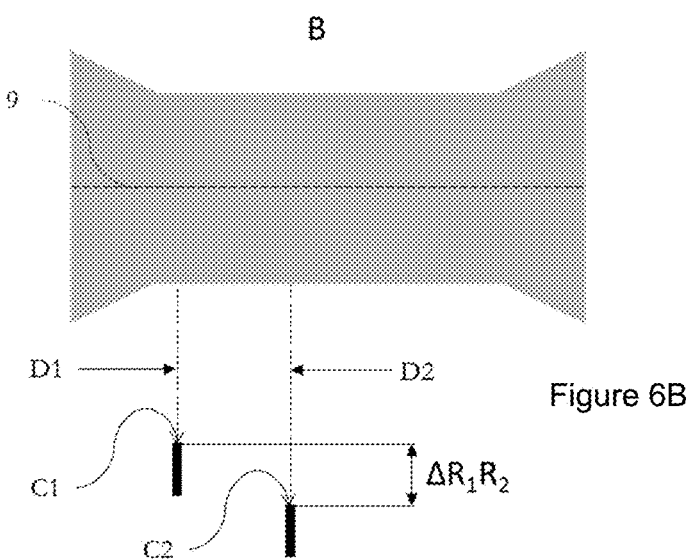
Figure 6C:
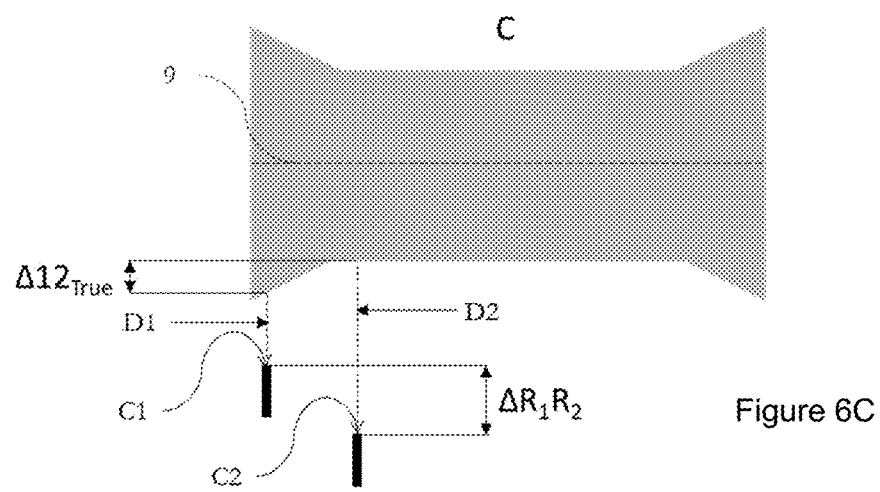

FIGS. 6A, 6B and 6C represent three different scenario where D1 and D2, are the shortest distance between their reference point and said coil:
A) Reference points R1 and R2 are at the same distance from the coil revolution axis 9 but only due to edge build-up, the distances D1 and D2 are different. In that case, the distance difference is equal to Δ12true and in that particular case, Δ12=Δ12true.
B) Reference points R1 and R2 are at different distances from the coil revolution axis and there is no detectable build-up on the coil so the distances D1 and D2 will be different only due to the reference points spacing from the coil revolution axis. In that case, knowing the distance of each reference point to the coil revolution axis, $\Delta R_1 R_2$, and/or the spacing between one reference point to another, the calculated distance needs to be adjusted. In that case, Δ12true=Δ12−$\Delta R_1 R_2$=0.
C) Reference points R1 and R2 are at different distances from the coil revolution axis and a coating build-up can be detected. So the distance difference between D1 and D2, Δ12, is impacted by the build-up and the distance of each reference point to the coil revolution axis. Consequently, Δ12true=Δ12−ΔR1R2≠0.

In a fourth step, the computed difference Δ12true is saved and accessible for further use.

Figure 7:
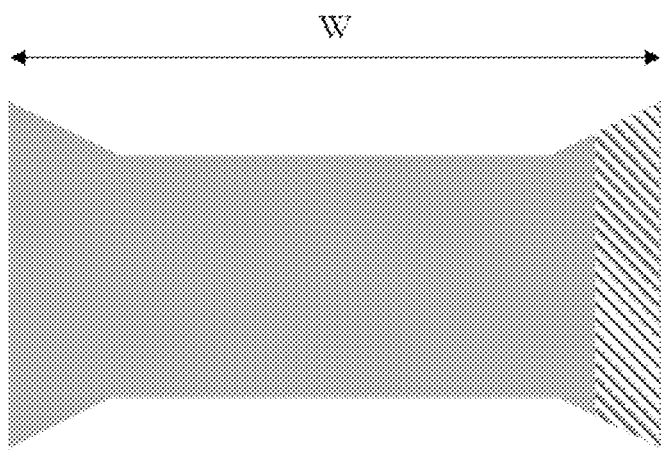
FIG. 7 exhibits an embodiment of a coil portion more subjected to coating build-up.

Then the first four steps A, B, C, D are repeated while moving at least one of the first or second point on the coil surface along at least a tenth of the whole coil width. Preferably, the displacement of the point on the coil surface is done through the displacement of the measuring means associated along the coil width. Such a displacement permits to measure several circumference differences along the coil width and thus control at least a tenth of the coil width, preferably said at least tenth of the whole coil width W is situated on a coil extremity because this coil portion is more subjected to coating build-up, as represented in FIG. 7 by a striped zone. Preferably, said steps A, B, C and D are repeated while moving at least one of the first or the second point on the coil surface along the whole coil width.

Figure 8:
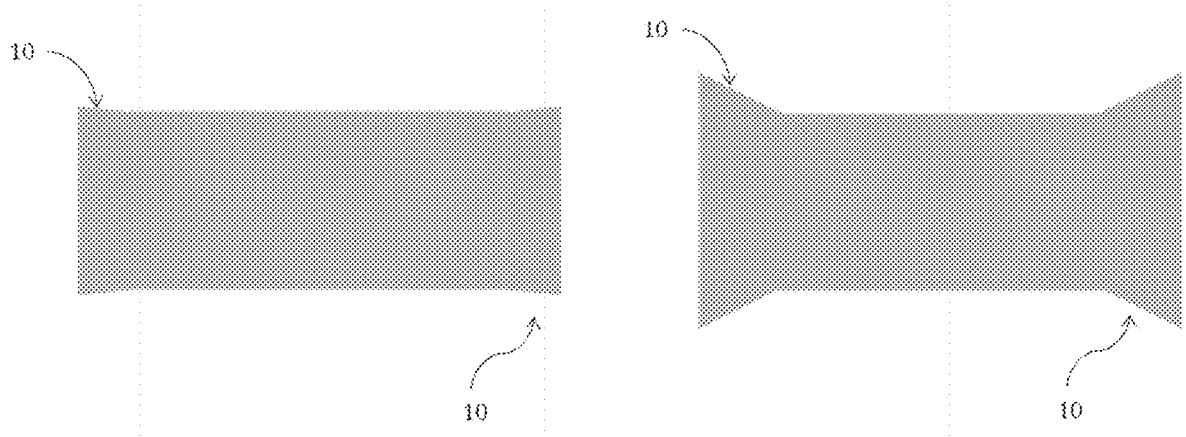
FIG. 8 exhibits a build-up difference between a 1-layer coil (A) and a 100-layers coil (B).

In another step, a threshold value M is defined. Such threshold value can be defined as the maximal circumference variation acceptable for a coil. Said threshold value might be defined in function of the number of layers of coated steel of the coil, or rotation made by the mandrel, because the unevenness in coating thickness might superimpose. For example, if there is a constant 0.1 mm coating thickness difference between an edge of the strip and its center, depending on the coil layer number, e.g. the number of mandrel rotation, the build-up 10 will be different as illustrated in FIG. 8 for a 1-layer coil on the left and a 100-layers coil on the right. For example, the maximum build-up allowed for light gauge having a 0.38 mm thickness can be defined as 0.15 µm. Generally, those coils have about 2000 wraps, so the maximum circumference difference allowed is of 0.3 mm (0.15 µm×2000). Whereas, the maximum build-up allowed for heavy gauge having a 2 mm thickness can be defined as 2.6 µm. Generally, those coils have about 380 wraps, so the maximum circumference difference allowed is of 0.9 mm (2.6 µm×380). In the last case, the threshold value M can be defined as: M=2.6 µm×wraps. So after 100 mandrel rotations or when the coil has 100 wraps, the threshold value will be defined as 0.26 mm.

After, the threshold value is compared to each saved difference Δ12true or to a sum of differences Δ12true. To ease the comparison, the threshold value can be compared to the absolute value of each saved difference Δ12true and/or to a sum of differences Δ12true. One comparison can be preferred to another in function of the control needed and of the spacing between the two points on the surface, C1 and C2, in the width direction. In the case where the threshold value is not compared to the absolute values, the threshold is made of a positive value M and a negative value –M so that if a difference Δ12true is lower than the negative threshold –M, an alert is emitted. The trigger of this alert is detailed after. Preferably, the threshold value is compared to each saved difference Δ12true and to a sum of differences Δ12true.

Figure 9:
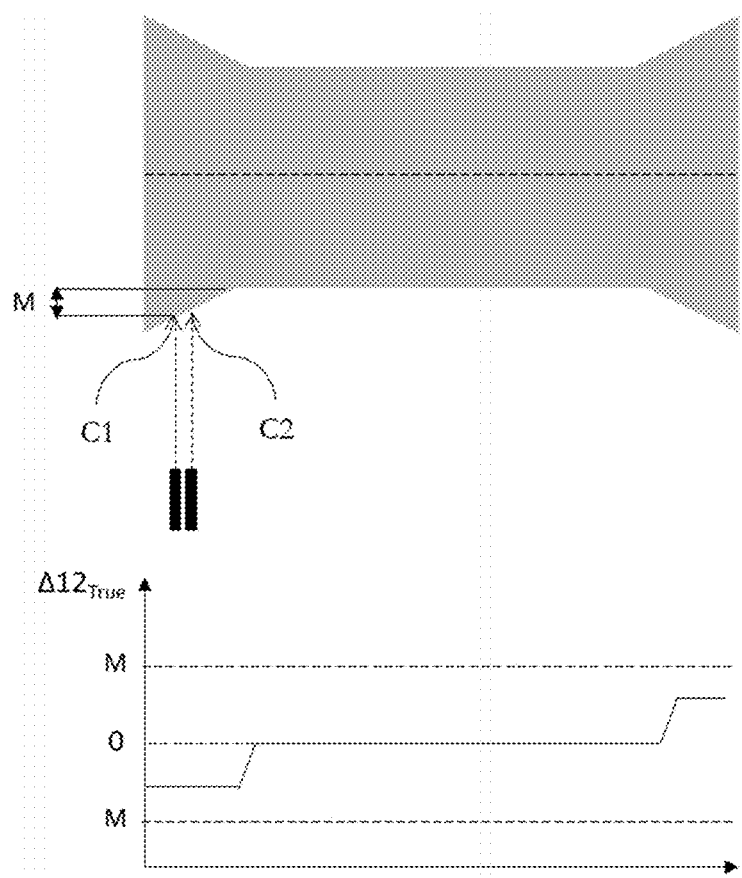
FIG. 9 exhibits a scheme of the measuring means and the coil (A) and a plot of the differences Δ12true along the coil width (B).

For example, if the threshold value is defined as being the maximal circumference variation difference between two points on the coil surface along its width, depending on the spacing between C1 and C2, noted $C_1C_2$, it can be detected or not. As illustrated in FIG. 9, in the case where the spacing between the two points on the surface, C1 and C2, is small, Δ12true might be lower than the threshold value. In FIG. 9 is plotted Δ12true along the coil width, so the difference of coil thickness at a point C1, representative of the circumference Circ1 of the coil at this position along the coil width, and a point C2, representative of the circumference Circ2 of the coil at this position along the coil width, is plotted. Consequently, even if the circumference difference between two points on the coil surface along its width is higher than the threshold value M, it is not detected in that case because there is no two-circumferences or coil thickness spaced of $C_1C_2$ that have a bigger difference than said threshold value M.

Figure 10:
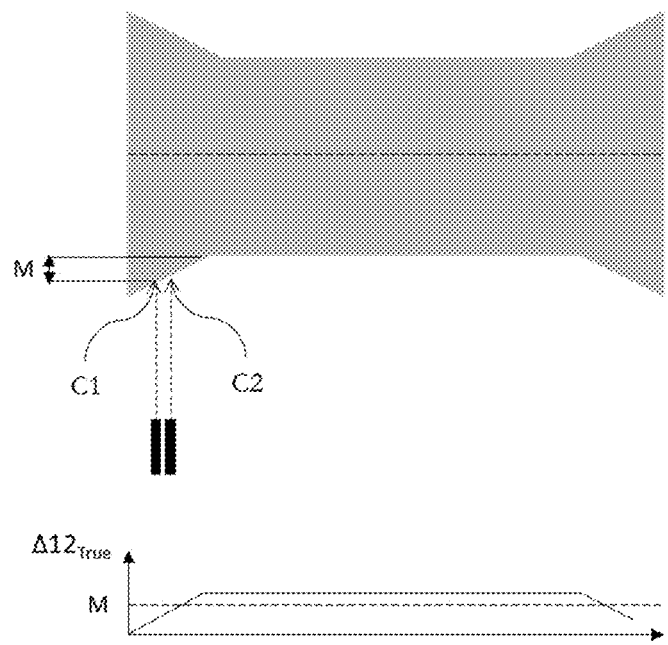
FIG. 10 exhibits a scheme of the measuring means and the coil (A) and a plot of the sum differences Δ12true along the coil width (B).

Consequently, it is possible to sum the differences, Δ12true, from one point on the coil width to another point on the coil width. This technique permits to know if there are at least two circumferences or two buildups that have a bigger difference than the threshold value and to get a coil profile. In FIG. 10 is plotted a sum of the differences along the coil width for the same coil as for FIG. 9. Thus a profile of the coil is obtained.

Finally, an alert is emitted when said difference Δ12true or said sum of differences Δ12true is higher than said threshold value M. The alert can be, but is not limited to, a visual alert or a sound alert or a combination thereof. The visual alert can be displayed on a screen and/or a human machine interface (HMI) and can highlight the zone comprising the defect. The audible alert can be like a klaxon sound. Preferably, an alert is emitted when said difference Δ12true and said sum of differences Δ12true is higher than said threshold value M.

Consequently, the invention permits to optimize the build-up measurement of a coil being wound. This optimization comprises the possibility to establish a circumference profile of the coil permitting to assess the coating thickness along the coil width and detect coating defect.

Preferably, at least one wiping parameters of a wiping station upstream of said coiling station during the wiping of said first and/or second point on the coil surface is saved. Preferably, said at least one wiping parameters is associated with its corresponding Δ12true. Such wiping parameters can be the wiping means type (air knives, other possibilities), the baffles position and design, the air jet speed, properties and repartition along the strip width, the coating nature and desired thickness, the strip speed, the wiping means wear. Said wiping parameters are not limited to previously mentioned parameters but all the parameters influencing the wiping are considered as wiping parameters. Such an association permits to establish a link between the wiping parameters and the final coating.

Preferably, said steps A and B are done simultaneously. This permits improvement of the measurement quality because it reduces the impact of the vibration on the measure.

Preferably, the first distance D1 and second distance D2 are between 0.15 m and 2.00 m. Due to vibrations, if said distances are below 0.15 meter, the coil due might collide the reference point which is generally a point of the distance measuring means and would thus damage the measuring mean. If the distance is greater than 2 meters, a large free space is required and thus negatively impacts the coiling station size.

Figure 11:
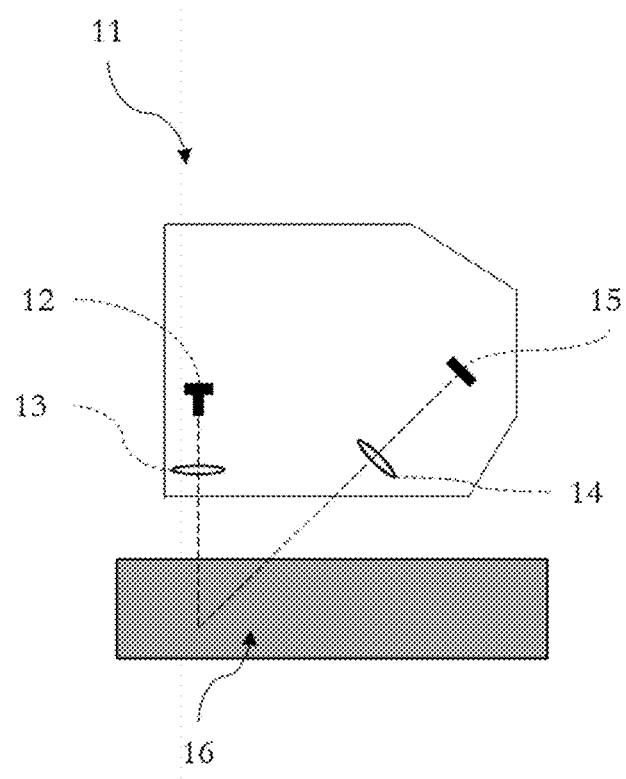
FIG. 11 exhibits an embodiment of a laser displacement sensor.

Preferably, said measuring of said first and second distances, D1 and D2, is done using laser displacement sensor 12. Such a sensor is advantageous because it is contactless, fast and accurate. As illustrated in FIG. 11, such a laser displacement sensor 11 comprises a laser 12, a transmitter lens 13, a receiver lens 14 and a light receiving element 15. Said laser aims a point on the coil surface 16. The distance between the light receiving element and the point on the coil surface can be considered as the distance between a reference point and a point on the coil surface. In that case, the reference point is the light receiving element.

Preferably, said laser displacement sensor emits a light having a wavelength comprised between 380 nm and 500 nm. Such a light offers less speckling, reduces signal noise and thus improves the measurement.

Preferably, said reference points R1 and R2 are at the same distance from the coil revolution axis. Such a positioning eases the determination of Δ12true=Δ12.

Preferably, said first and second points on the coil surface, C1 and C2, are spaced by a distance $D_{C12}$ along the coil width W, $0<D_{C12}<0.50 \times W$. When the spacing exceeds half the coil width, a portion of the coating thickness along the coil width cannot be estimated.

Figure 12A:
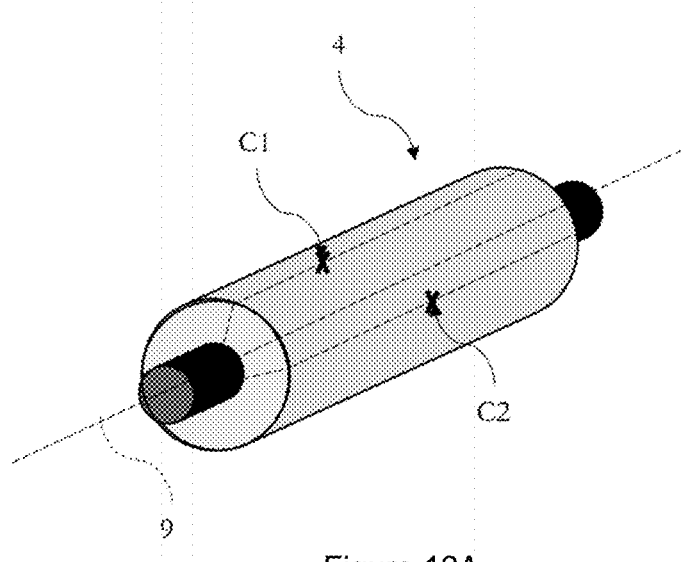
FIGS. 12A and 12B exhibit a coil, its revolution axis and two points on its surface (12A) and a projection of an angle formed by the points on its surface and its revolution axis (12B)
Figure 12B:
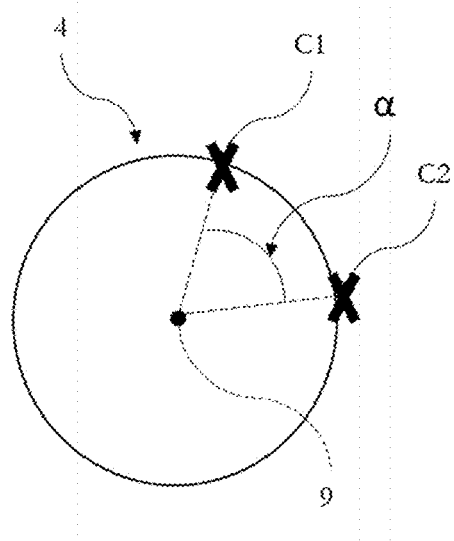

Preferably, when the revolution axis of the coil, the first and second points on the coil surface, C1 and C2, are projected on a disc parallel to a coil side, an angle formed by a line from the projected revolution axis and the first point on the coil and by a line from the projected revolution axis and the second point on the coil is comprised between 0° and 30°. FIG. 12A, represents a coil 4, its revolution axis 9, a first and second points on the coil surface C1 and C2. FIG. 12B illustrates the coil projection and the angles α formed by C1, the revolution 9 axis and C2. It permits to improve the measurement accuracy because the vibration impact on the measurement is reduced and the assumptions are closer to the reality.

Preferably, when the revolution axis of the coil, the first and second points on the coil surface, C1 and C2, are projected on a disc parallel to a coil side, an angle formed by a line from the projected revolution axis and the first point on the coil and by a line from the projected revolution axis and the second point on the coil is comprised between 0° and 10°.

Preferably, said first and second points on the coil surface, C1 and C2, are on an axis parallel to the coil revolution axis. Such an alignment permits to improve the measurement accuracy because the vibration impact on the measurement is reduced, the assumptions are even closer to the reality.

Preferably, said threshold value M is between comprised between 0.10 μm and 3 μm per wraps.

Preferably, said threshold value M is between comprised between 0.1 mm and 0.3 mm. Such a range permits to detect coating build-up for several steel grades.

Preferably, the first and/or the second point on the coil surface are moved at a speed $S_{CAPTORS}$, said coil having a width W and being coiled in a time $T_{COILING}$, such that: $S_{CAPTORS} > W/T_{COILING}$. Such a speed permits to detect the buildup and take corrective action before the coiling is done which permit to increase the coating quality of the coil.

Preferably, a build-up profile along the coil width is done by using said computed difference Δ12true. Said build-up profile can be made by summing all the computed difference from one point on the coil width to another. Said build-up profile can, but not necessarily, be plotted from one end of the coil width to another.

Preferably, said coating is wiped at a wiping station, comprising at least one baffle having a controlled position, upstream of the place where the coil is being wound, said at least one baffle position is adjusted using said build-up profile.

Figure 13:
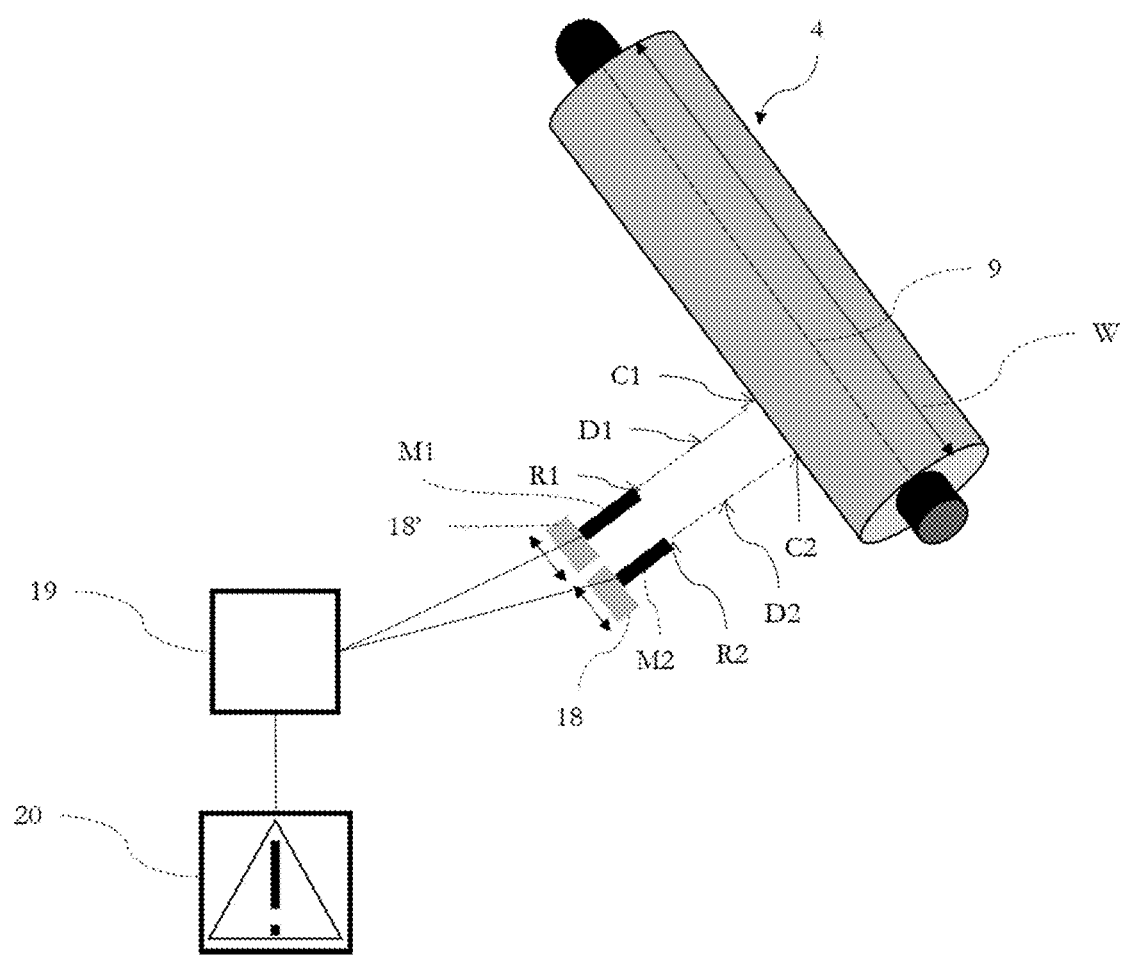
FIG. 13 exhibits two views of an embodiment of a coiling station

As illustrated in FIG. 13, the invention also relates to a coiling station 17 controlling, on a metallic coated coil 4 being wound, the coating thickness homogeneity, said coiling station 17 comprising
- a first distance measurement system M1 able to measure a first distance, D1, between a first reference point, R1, and a first point on the coil surface C1
- a second distance measurement system M2 able to measure a second distance, D2, between a second reference point, $R_2$, and a second point on the coil surface C2
said first and second points on the coil being situated at different spots along the coil width
- a displacement system 18 permitting to move said first distance measurement system, M1, and/or said second distance measurement system, M2, at least along the whole coil width,
- said first and second distance measurement systems, M1 and M2, being able to be positioned at a distance between 0.15 m and 2.00 m, from the coil position,
- a computing means 19 connected to said first and second distance measurement systems, M1 and M2,
- an alerting means 20 connected to said computing means.

The displacement system can be composed a displacement system per measurement system as illustrated in FIG. 13 wherein the displacement system 18 can move the measurement system M2 and the displacement system 18' can move the measurement system M1.

Preferably, said coiling station 17 executes the method of the present invention.

Preferably, said coiling station 17 and said displacement system 18 permits to move said first distance measurement system, M1, and said second distance measurement system, M2, at least along the whole coil width W.

The invention has been described above as to the embodiment which is supposed to be practical as well as preferable at present. However, it should be understood that the invention is not limited to the embodiment disclosed in the specification and can be appropriately modified within the range that does not depart from the gist or spirit of the invention, which can be read from the appended claims and the overall specification.

What is claimed is:

1. A method for inspecting, on a metallic coated coil being wound, a coating thickness homogeneity, the method comprising the following steps:
   A) measuring a first distance D1 between a first reference point R1 and a first point C1 on a coil surface of the metallic coated coil by a first sensor,
   B) measuring a second distance D2 between a second reference point R2 and a second point C2 on the coil surface, the first and second points C1, C2 being situated at different spots along a coil width W of the metallic coated coil by a second sensor;
   C) computing a difference between the first distance D1 and the second distance D2 with a computer, the difference being denoted as difference Δ12true;
   D) saving the difference Δ12true to the computer;
   E) repeating steps A, B, C and D while moving at least one of the first point C1 or the second point C2 on the coil surface along at least a tenth of an entirety of the coil width W by displacing said first sensor and/or second sensor along the coil width W;
   defining a threshold value M;
   comparing each saved difference Δ12true to the threshold value M or comparing a sum of differences Δ12true to the threshold value M; and
   emitting an alert when said difference Δ12true or said sum of differences Δ12true is higher than said threshold value M, wherein a build-up profile is generated by the computer using said saved differences Δ12true.

2. The method as recited in claim 1 wherein the first distance D1 and second distance D2 are between 0.15 m and 2.00 m.

3. The method as recited in claim 1 wherein the steps A and B are done simultaneously.

4. The method as recited in claim 1 wherein the first and second sensors are laser displacement sensors.

5. The method as recited in claim 4 wherein the laser displacement sensor emits a light having a wavelength between 380 nm and 500 nm.

6. The method as recited in claim 1 wherein the reference points R1 and R2 are on at a same distance from a coil revolution axis of the metallic coated coil.

7. The method as recited in claim 1 wherein the first point C1 and the second point C2 are spaced by a distance $D_{C12}$ along a coil width W:

$$0 < D_{C12} < 0.50 W.$$

8. The method as recited in claim 1 wherein the first point C1 and the second point C2 are on an axis parallel to a coil revolution axis of the metallic coated coil.

9. The method as recited in claim 1 wherein the threshold value M is between 0.10 μm and 3 μm per wrap of the metallic coated coil around a coil revolution axis of the metallic coated coil.

10. The method as recited in claim 1 wherein the first point C1 or the second point C2 are moved at a speed $S_{CAPTORS}$, the metallic coated coil being coiled in a time $T_{COILING}$, such that $S_{CAPTORS}$ is greater than the width W divided by the time $T_{COILING}$.

11. The method as recited in claim 1 wherein the coating is wiped at a wiping station having at least one baffle having a controlled position, upstream of a location where the metallic coated coil is being wound, the controlled position being adjusted using the build-up profile.

* * * * *